(12) United States Patent  (10) Patent No.: US 8,005,701 B2
Hayler et al.  (45) Date of Patent: Aug. 23, 2011

(54) SYSTEMS AND METHODS FOR GENERATING A WORK SCHEDULE

(75) Inventors: Eric A. Hayler, Duncan, SC (US); Bruce Lance, Simpsonville, SC (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1195 days.

(21) Appl. No.: 11/448,824

(22) Filed: Jun. 8, 2006

(65) Prior Publication Data

US 2007/0288287 A1   Dec. 13, 2007

(51) Int. Cl.
G06F 15/02 (2006.01)
(52) U.S. Cl. ...................................... 705/7.13
(58) Field of Classification Search .............. 705/9, 7.13
See application file for complete search history.

(56) References Cited

U.S. PATENT DOCUMENTS

| | | | | |
|---|---|---|---|---|
| 6,571,193 | B1* | 5/2003 | Unuma et al. | 702/141 |
| 6,865,581 | B1* | 3/2005 | Cloninger et al. | 1/1 |
| 2003/0167238 | A1* | 9/2003 | Zeif | 705/400 |
| 2005/0131737 | A1* | 6/2005 | Joseph et al. | 705/2 |
| 2006/0200008 | A1* | 9/2006 | Moore-Ede | 600/300 |
| 2006/0253464 | A1* | 11/2006 | Thilakawardana et al. | 707/100 |
| 2006/0259472 | A1* | 11/2006 | MacClellan | 707/3 |

OTHER PUBLICATIONS

Carnahan, Brian et al. "A Genetic Algorithm for Designing Job Rotation Schedules Considering Ergonomic Constraints." IEEE, Sep. 1999.*
Schniederjans, Marc et al. "A Heuristic Job Scheduling Decision Support System." Decision Support Systems 18 (1996) 159-166.*
Dubian, Clemens, et al. "Design and Usage of an IT-System for Workplace Management with Ergonomic Analysis Under Health Protection Aspects." 2007.*
MacLeod, Dan et al. "Job Rotation System Report to XYZ Co." 1993.*
Tharmmaphornphilas, Wipawee, et al. "A Quantitative Method for Determining Proper Job Rotation Intervals." Annals of Operations Research 128, 251-266, 2004.*
Robledo-Gallegos, Abraham. "Complementing the Washington Ergonomics Assessment Method with the Strain Index." retrieved from the Internet [URL: http://www.iienet.org/uploadedfiles/Ergo_Community/Case_Studies/31.pdf] on Mar. 12, 2010.*

* cited by examiner

*Primary Examiner* — Susanna M Diaz
(74) *Attorney, Agent, or Firm* — Crowell & Moring LLP

(57) ABSTRACT

Systems and methods for generating work schedules are provided. Work schedules are generated based on an identification of work periods and tasks and information related to the workers. A work schedule is produced based on a selected optimization parameter. The optimization parameter can be any type of parameter related to the tasks and workers. The optimization parameter can be ergonomic impact, level of training, experience level or the like. The systems and methods can also receive assigned tasks for one or more of the workers, and generate a schedule incorporating the assignments.

22 Claims, 16 Drawing Sheets

Worker Restrictions

| | Neck | Left Shoulder | Right Shoulder | Left Elbow | Right Elbow | Left Hand | Right Hand | Back | Left Hip | Right Hip | Left Thigh | Right Thigh | Left Knee | Right Knee |
|---|---|---|---|---|---|---|---|---|---|---|---|---|---|---|
| Worker 1 | 1 | | | | 1 | | | | | | | 1 | | 1 |
| Worker 2 | 1 | 1 | | 1 | | | | 1 | | | | | | |
| Worker 3 | | | | | | | | | | | | | | |
| Worker 4 | | | | | | | | | 1 | | | | | |
| Worker 5 | | | | | 1 | | 1 | | | | | | | |
| Worker 6 | 1 | | | | | | | | 1 | | | | 1 | |
| Worker 7 | | | | | | | | | | | | | | |
| . | | | | | | | | | | | | | | |
| . | | | | | | | | | | | | | | |
| . | | | | | | | | | | | | | | |
| Worker X | | | | | | | | | | | | | | |

FIGURE 4

Training Information

| | Task 1 | Task 2 | Task 3 | Task 4 | Task 5 | Task 6 | Task 7 | Task 8 | Task 9 | . | . | Task Y |
|---|---|---|---|---|---|---|---|---|---|---|---|---|
| Worker 1 | 0 | 1 | 2 | 2 | 2 | 0 | 2 | 2 | 2 | | | 2 |
| Worker 2 | 0 | 2 | 0 | 1 | 2 | 2 | 2 | 1 | 0 | | | 2 |
| Worker 3 | 2 | 2 | 2 | 2 | 2 | 1 | 2 | 2 | 0 | | | 2 |
| Worker 4 | 2 | 1 | 2 | 2 | 2 | 2 | 0 | 1 | 2 | | | 1 |
| Worker 5 | 2 | 2 | 2 | 2 | 2 | 2 | 0 | 2 | 2 | | | 0 |
| Worker 6 | 2 | 2 | 2 | 2 | 2 | 2 | 2 | 2 | 2 | | | 2 |
| Worker 7 | 2 | 0 | 2 | 1 | 2 | 2 | 2 | 2 | 2 | | | 2 |
| Worker 8 | 1 | 2 | 2 | 2 | 2 | 2 | 2 | 2 | 1 | | | 2 |
| Worker 9 | 2 | 2 | 1 | 2 | | 2 | | 2 | | | | |
| . | | | | | | | | | | | | |
| . | | | | | | | | | | | | |
| Worker X | 2 | 2 | 2 | 2 | 2 | 2 | 0 | 2 | 1 | | | 2 |

Return to Main

FIGURE 5

Experience Information

|           | Task 1 | Task 2 | Task 3 | Task 4 | Task 5 | Task 6 | Task 7 | Task 8 | Task 9 | . | . | Task Y |
|-----------|--------|--------|--------|--------|--------|--------|--------|--------|--------|---|---|--------|
| Worker 1  | 5 | 5 | 7 | 4 | 7 | 5 | 6 | 6 | 5 | | | 8 |
| Worker 2  | 7 | 6 | 7 | 5 | 4 | 6 | 5 | 5 | 6 | | | 6 |
| Worker 3  | 5 | 5 | 5 | 6 | 6 | 7 | 9 | 6 | 6 | | | 5 |
| Worker 4  | 9 | 2 | 8 | 5 | 5 | 5 | 7 | 5 | 5 | | | 5 |
| Worker 5  | 1 | 4 | 6 | 7 | 5 | 5 | 8 | 2 | 8 | | | 5 |
| Worker 6  | 5 | 5 | 5 | 5 | 3 | 6 | 5 | 6 | 4 | | | 6 |
| Worker 7  | 6 | 6 | 6 | 6 | 4 | 4 | 5 | 5 | 5 | | | 5 |
| Worker 8  | 5 | 5 | 5 | 6 | 5 | 6 | 4 | 5 | 5 | | | 8 |
| Worker 9  | 8 | 8 | 5 | 6 | 5 | 5 | 5 | 5 | 5 | | | 2 |
| .         |   |   |   |   |   |   |   |   |   | | |   |
| .         |   |   |   |   |   |   |   |   |   | | |   |
| Worker X  | 9 | 2 | 8 | 5 | 6 | 6 | 6 | 5 | 7 | | | 9 |

Return to Main

Ergonomic Input – Numerical

| | Neck | Left Shoulder | Right Shoulder | Left Elbow | Right Elbow | Left Hand | Right Hand | Back | Left Hip | Right Hip | Left Thigh | Right Thigh | Left Knee | Right Knee |
|---|---|---|---|---|---|---|---|---|---|---|---|---|---|---|
| Task 1 | 0 | 0 | 0 | 0 | 0 | 0 | 0 | 0 | 0 | 0 | 0 | 0 | 0 | 0 |
| Task 2 | 0 | 0 | 0 | 0 | 0 | 0 | 0 | 0 | 0 | 0 | 0 | 0 | 0 | 0 |
| Task 3 | 0 | 1 | 0 | 0 | 0 | 0 | 0 | 2 | 0 | 0 | 0 | 0 | 0 | 0 |
| Task 4 | 0 | 0 | 0 | 0 | 1 | 0 | 0 | 0 | 0 | 0 | 0 | 0 | 0 | 0 |
| Task 5 | 0 | 0 | 0 | 0 | 0 | 0 | 0 | 0 | 0 | 2 | 0 | 0 | 0 | 0 |
| Task 6 | 0 | 0 | 0 | 0 | 0 | 0 | 0 | 0 | 0 | 0 | 0 | 0 | 0 | 0 |
| Task 7 | 0 | 0 | 2 | 0 | 0 | 0 | 1 | 0 | 0 | 0 | 0 | 0 | 0 | 0 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| Task Y | 0 | 0 | 0 | 0 | 0 | 0 | 0 | 0 | 0 | 0 | 0 | 0 | 0 | 0 |

Return to Main

FIGURE 8

| | Special Assignments | | | | | | | | | |
|---|---|---|---|---|---|---|---|---|---|---|
| | Task 1 | Task 2 | Task 3 | Task 4 | Task 5 | Task 6 | Task 7 | Task 8 | Task 9 | . . . | Task Y |
| Time Period 1 | | | | | | | | | | | |
| Time Period 2 | | | | | | Worker 1 | | | | | |
| Time Period 3 | | | | | Worker 2 | | | | | | |
| Time Period 4 | | | | | | | | | | | |

Return to Main

FIGURE 9

Worker Assignments

|  | Task 1 | Task 2 | Task 3 | Task 4 | Task 5 | Task 6 | Task 7 | Task 8 | Task 9 | . | . | Task Y |
|---|---|---|---|---|---|---|---|---|---|---|---|---|
| Time Period 1 | Worker 1 | Worker 2 | Worker 3 | Worker 4 | Worker 5 | Worker 6 | Worker 7 | Worker 8 | Worker 9 | . | . | Worker X |
| Time Period 2 | Worker 9 | Worker 3 | Worker 4 | Worker 6 | Worker 2 | Worker 1 | Worker 8 | Worker 4 | Worker X | . | . | Worker 5 |
| Time Period 3 | Worker 7 | Worker 1 | Worker X | Worker 5 | Worker 3 | Worker 8 | Worker 9 | Worker 2 | Worker 4 | . | . | Worker 6 |
| Time Period 4 | Worker 3 | Worker X | Worker 5 | Worker 1 | Worker 2 | Worker 9 | Worker 4 | Worker 9 | Worker 8 | . | . | Worker 7 |

| Rotation | Training | Experience | Ergonomic Impact | Ergonomic Deviation | Fit Factor | Worker Satisfaction | F Factor |
|---|---|---|---|---|---|---|---|
| 98.68 | 1.99 | 7.13 | 1.31 | 60 | 6.11 | 3.12 | 19.9 |

Return to Main   Evaluate Changes

FIGURE 10

Rotation

| | Task 1 | Task 2 | Task 3 | Task 4 | Task 5 | Task 6 | Task 7 | Task 8 | Task 9 | . . . | Task Y |
|---|---|---|---|---|---|---|---|---|---|---|---|
| Time Period 1 | Worker 1 | Worker 2 | Worker 3 | Worker 4 | Worker 5 | Worker 6 | Worker 7 | Worker 8 | Worker 9 | . . . | Worker X |
| Time Period 2 | Worker 9 | Worker 3 | Worker 4 | Worker 6 | Worker 2 | Worker 1 | Worker 8 | Worker 4 | Worker X | . . . | Worker 5 |
| Time Period 3 | Worker 7 | Worker 1 | Worker X | Worker 5 | Worker 3 | Worker 8 | Worker 9 | Worker 2 | Worker 4 | . . . | Worker 6 |
| Time Period 4 | Worker 3 | Worker X | Worker 1 | Worker 5 | Worker 2 | Worker 9 | Worker 4 | Worker 9 | Worker 8 | . . . | Worker 7 |
| Total Rotation | 4 | 4 | 4 | 3 | 4 | 4 | 4 | 4 | 4 | . . . | 4 |

| Overall Rotation | 98% |
|---|---|

FIGURE 11

Training

|  | Task 1 | Task 2 | Task 3 | Task 4 | Task 5 | Task 6 | Task 7 | Task 8 | Task 9 | . . | . . | Task Y |
|---|---|---|---|---|---|---|---|---|---|---|---|---|
| Time Period 1 | 2 | 2 | 2 | 2 | 2 | 2 | 1 | 2 | 2 | . | . | 2 |
| Time Period 2 | 2 | 2 | 2 | 2 | 2 | 2 | 2 | 2 | 2 | . | . | 2 |
| Time Period 3 | 2 | 2 | 1 | 2 | 2 | 2 | 2 | 2 | 2 | . | . | 2 |
| Time Period 4 | 1 | 2 | 2 | 2 | 2 | 2 | 2 | 2 | 2 | . | . | 2 |
| Average Training | 1.75 | 2 | 1.75 | 2 | 2 | 2 | 1.75 | 2 | 2 | . | . | 2 |

| Overall Average Training |
|---|
| 1.99 |

FIGURE 12

| | Experience | | | | | | | | | | |
|---|---|---|---|---|---|---|---|---|---|---|---|
| | Task 1 | Task 2 | Task 3 | Task 4 | Task 5 | Task 6 | Task 7 | Task 8 | Task 9 | . . | Task Y |
| Time Period 1 | 8 | 6 | 6 | 8 | 7 | 8 | 8 | 8 | 9 | . . | 8 |
| Time Period 2 | 7 | 8 | 6 | 5 | 7 | 8 | 5 | 8 | 9 | . . | 7 |
| Time Period 3 | 8 | 8 | 8 | 8 | 8 | 8 | 8 | 7 | 5 | . . | 7 |
| Time Period 4 | 5 | 7 | 9 | 8 | 6 | 8 | 8 | 7 | 8 | . . | 7 |
| Average Experience | 7 | 7.25 | 7.25 | 7.25 | 7 | 8 | 7.25 | 7.5 | 7.75 | . . | 7.25 |

| Overall Average Experience | 7.3 |
|---|---|

SYSTEMS AND METHODS FOR GENERATING A WORK SCHEDULE

BACKGROUND OF THE INVENTION

In order to decrease production time and costs, factories have employed assembly lines, in which workers are assigned specific tasks in the manufacture of a product. In order to comply with ergonomic regulations, decrease medical costs and improve worker satisfaction, many factories now rotate workers to different positions within the assembly line or factory. Assigning workers to particular positions and rotating workers between positions on the assembly line must account for a number of different variables, including, but not limited to, training and experience on particular portions of the assembly line, ergonomic impact of different positions on the assembly line, etc. Each of these variables can include a number of sub-variables. For example, ergonomic impact can include values for the impact to various different body parts.

Typically, assignment and rotation of workers on an assembly line is performed by a supervisor. The supervisor assigns each worker to a different positions over the number of rotations. This typically results in a sub-optimal assignment of workers due to the large number of possible combinations of workers, positions and rotations. For example, in an assembly line with 18 workers, 18 work stations and 4 rotations, there are $6.4 \times 10^{15}$ possible combinations. Due to the large number of combinations, and the number of different variables to account for, a supervisor cannot possibly obtain an optimum assignment of workers. Sub-optimal assignments of workers can increase workplace injuries, reduce worker satisfaction and reduce resulting product quality. Accordingly, systems and methods for optimal assignment of workers on an assembly line are desired.

SUMMARY OF THE INVENTION

Systems and methods for generating work schedules are provided. Work schedules are generated based on an identification of work periods and tasks and information related to the workers. A work schedule is produced based on a selected optimization parameter. The optimization parameter can be any type of parameter related to the tasks and workers. For example, the optimization parameter can be ergonomic impact, level of training, experience level or the like. The systems and methods can also receive assigned tasks for one or more of the workers, and generate a schedule incorporating the assignments. Generating a work schedule optimized for one or more parameters can increase worker satisfaction, decrease injuries and/or improve product quality.

Other objects, advantages and novel features of the present invention will become apparent from the following detailed description of the invention when considered in conjunction with the accompanying drawings.

BRIEF DESCRIPTION OF THE DRAWING FIGURES

FIG. 4 is a block diagram of an exemplary worker restriction input screen in accordance with the present invention;

FIG. 5 is a block diagram of an exemplary training information input screen in accordance with the present invention;

FIG. 6 is a block diagram of an exemplary experience information input screen in accordance with the present invention;

FIG. 7 is a block diagram of an exemplary ergonomic rating input screen in accordance with the present invention;

FIG. 8 is a block diagram of another exemplary ergonomic rating input screen in accordance with the present invention;

FIG. 9 is a block diagram of an exemplary special assignments input screen in accordance with the present invention;

FIG. 10 is a block diagram of an exemplary work schedule output screen in accordance with the present invention;

FIG. 11 is a block diagram of an exemplary work schedule rotation output screen in accordance with the present invention;

FIG. 12 is a block diagram of an exemplary work schedule training output screen in accordance with the present invention;

DETAILED DESCRIPTION OF THE PREFERRED EMBODIMENTS

Figure 1:
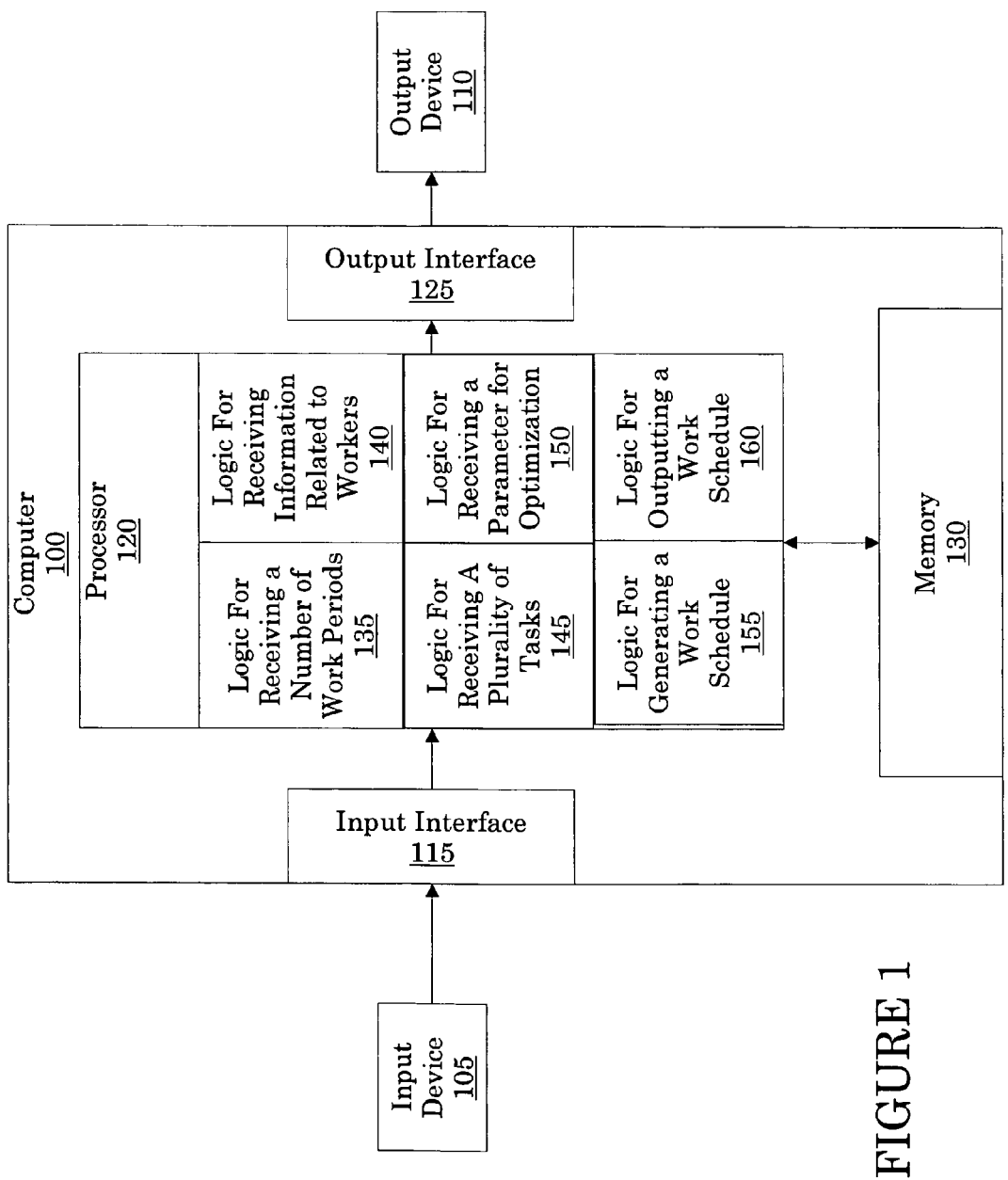
FIG. 1 is a block diagram of an exemplary system in accordance with the present invention.

FIG. 1 is a block diagram of an exemplary system for producing a work schedule in accordance with the present invention. The system includes an computer 100 coupled to an input device 105 and an output device 110. The input device can be a keyboard, mouse, bar-code scanner, or the like. Output device 110 can a monitor, printer, or the like. Input device 105 is coupled to a processor 120 via input interface 115. Input interface 115 can be any type of interface appropriate for receiving information from input device 105 and providing such information to processor 120. Processor 120 is coupled to output device 110 via output interface 125. Output interface 125 can be any type of interface appropriate for receiving information from processor 120 and providing the information to output device 110. Processor 120 can be coupled to other types of devices (not illustrated) such as a network, external disk drive, or the like via an input/output interface.

Processor 120 can be any type of processor, including a microprocessor, field programmable gate array (FPGA), application specific integrated circuit (ASIC), or the like. Processor 120 includes logic for receiving a number of work periods 135, logic for receiving information related to workers 140, logic for receiving a plurality of tasks 145, logic for receiving a parameter for optimization 150, logic for generating a work schedule 155 and logic for outputting a work schedule 160, all of which will be described in more detail below in connection with FIGS. 2a and 2b. Memory 130 can be any type of memory, including random access memory, read only memory, flash memory, a hard disk and/or the like. When processor 120 is a microprocessor, memory 130 can store a computer program product comprising the logic used by processor 120 to generate a work schedule.

Figure 2A:
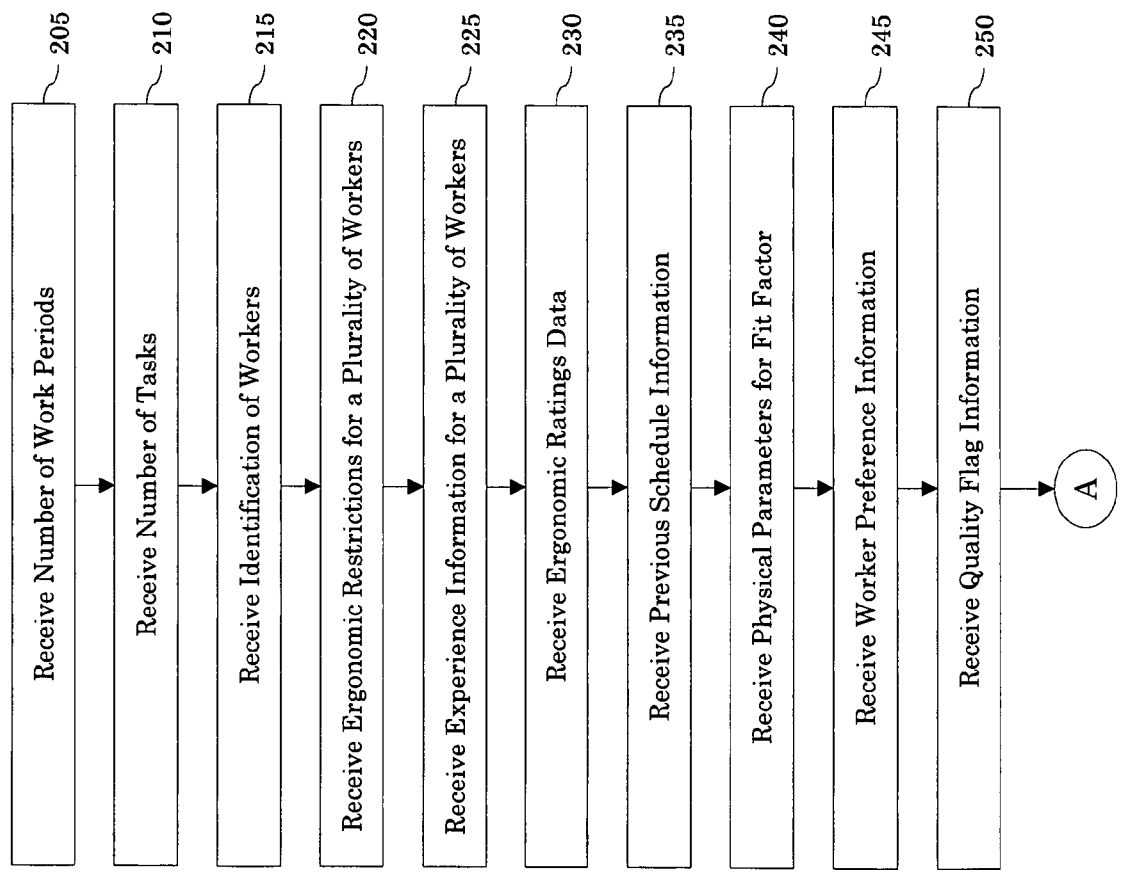
FIGS. 2a and 2b are flow diagrams of an exemplary method for producing a work schedule in accordance with the present invention.
Figure 2B:
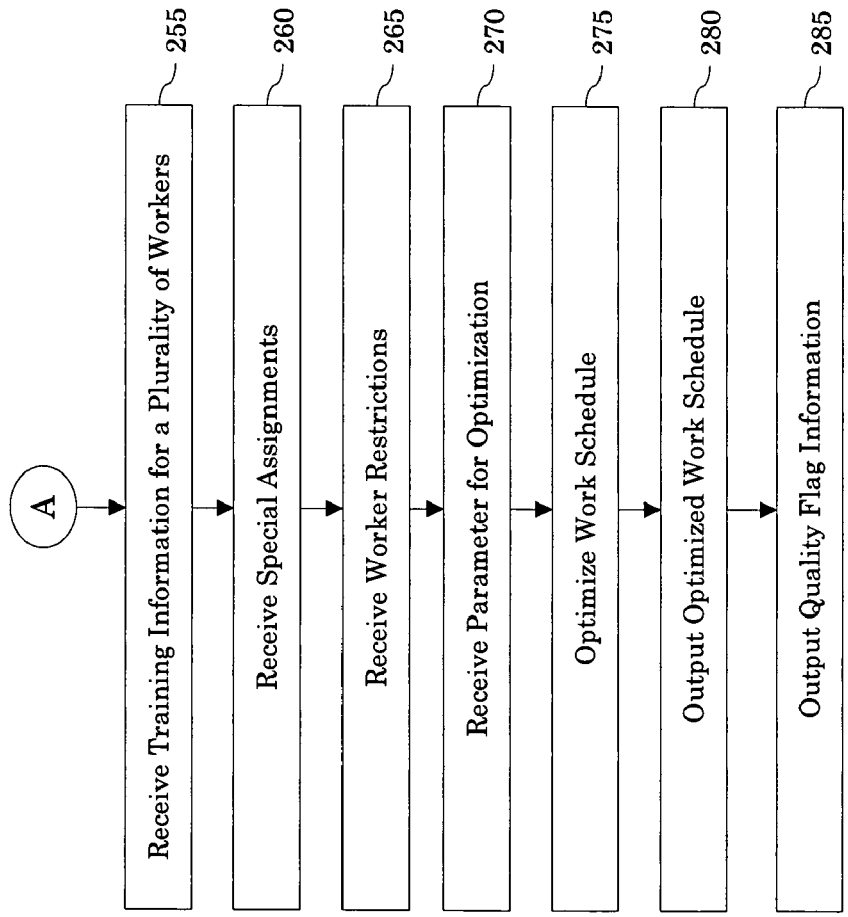

FIGS. 2a and 2b are flow diagrams of an exemplary method for producing a work schedule in accordance with the present invention. Initially, processor 120 receives a number of work periods for the work schedule (step 205). The number of work periods can be for a particular day, for a number of days of a week, or the like. Processor 120 then receives a number of tasks for assignment in the work schedule (step 110). The number of work periods and tasks can be received from input device 105 and/or can be received from memory 130.

Once the number of work periods and tasks have been defined, logic for receiving information related to workers 140 receives various pieces of information related to each of a plurality of workers. Specifically, in the exemplary embodiments of the present invention, an identification of the workers, ergonomic restrictions, experience information, ergonomic ratings information, previous schedule information, physical parameters fit factor information, associate preferences, quality flag information, training information and any special assignments are received by processor 120 (steps 215-260), which can be input via the user interfaces illustrated in FIGS. 3-9.

Figure 3:
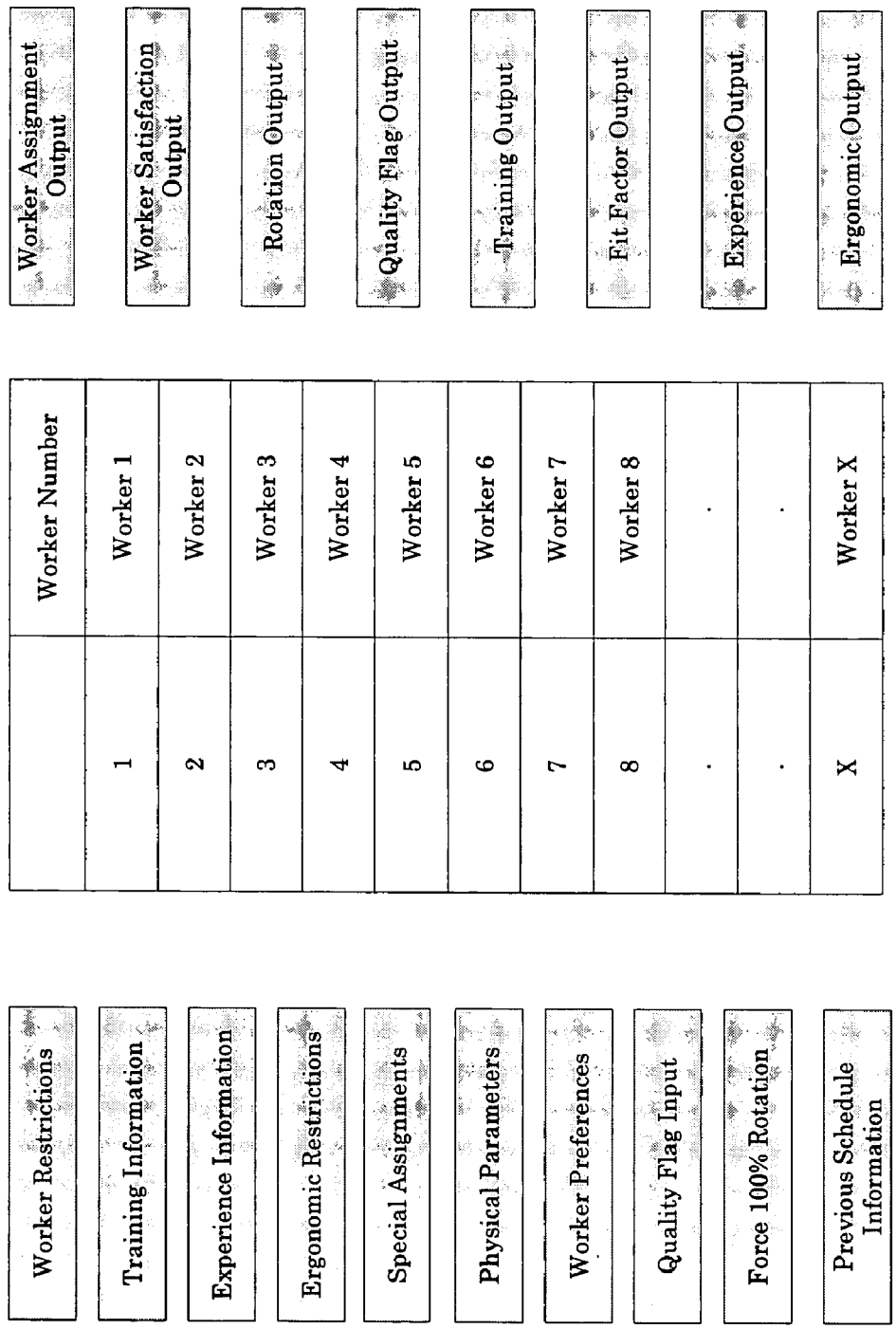
FIG. 3 is a block diagram of an exemplary main menu for generating a work schedule in accordance with the present invention.

FIG. 3 is a block diagram of an exemplary main menu for generating a work schedule in accordance with the present invention. The buttons on the left side of the main menu are for selecting input screens and the buttons on the right side of the main menu are for selecting output screens. The table between the input and output screen selection buttons lists all of the workers available for assignment to the various tasks.

The worker restrictions input screen selection button of FIG. 3 causes the output of the worker restriction input screen illustrated in FIG. 4. The worker restriction input screen allows the input of various ergonomic restrictions on particular workers.

The training information input screen selection button of FIG. 3 causes the output of the training information input screen illustrated in FIG. 5. This input screen allows the input of a rating for each worker of the amount of training they have received for various tasks.

The experience information input screen selection button of FIG. 3 causes the output of the experience information input screen illustrated in FIG. 6. This input screen allows the input of a rating for each worker of the amount of experience they have for various tasks. Experience can account for a number of years on the job, number of hours on the job and/or number of defects per unit.

Figure 7:
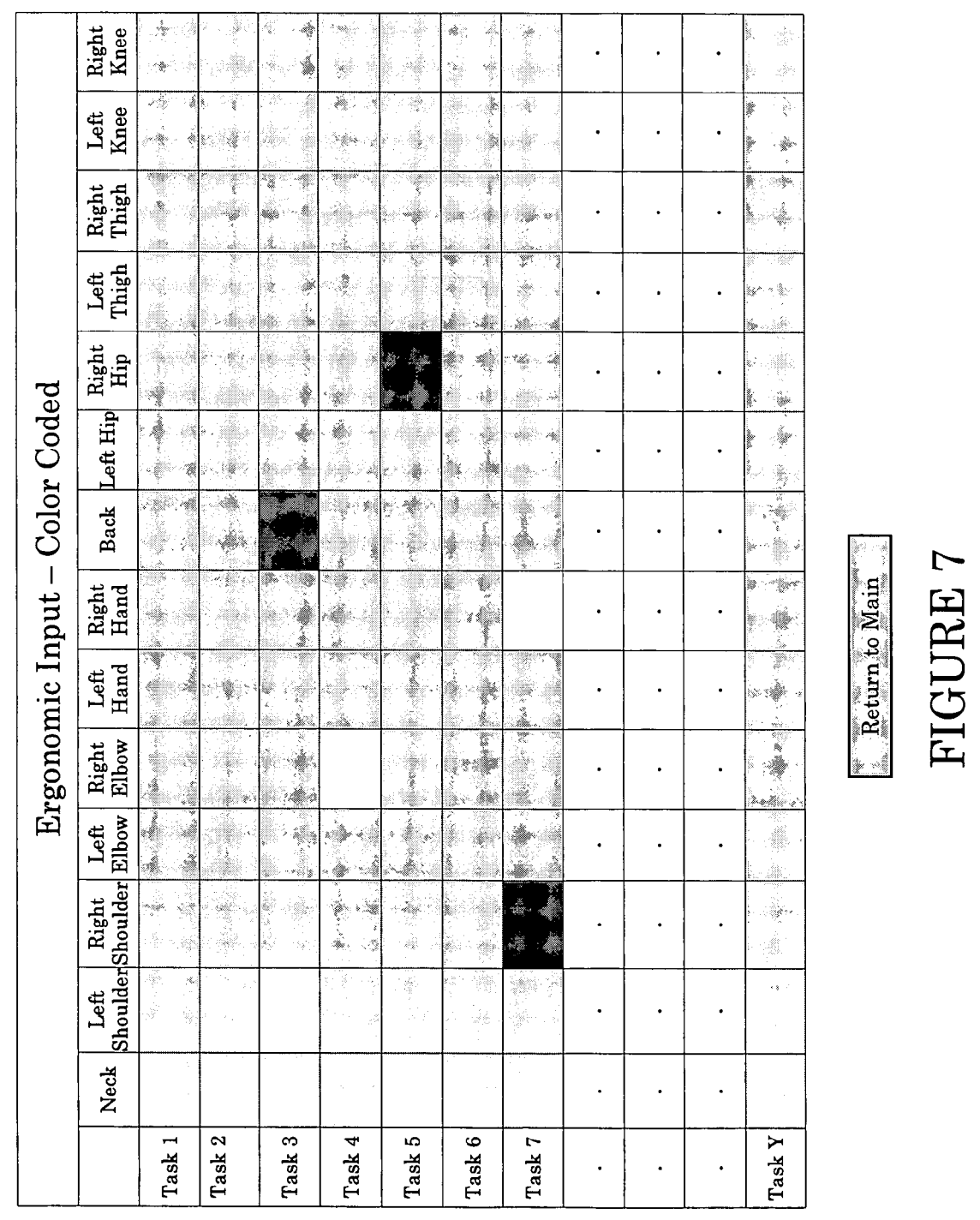

The input screens of FIGS. 7 and 8 provide a detailed breakdown of the ergonomic rating input screens for various tasks. The input screen of FIG. 7 is color-coded to identify ergonomic deviations, while the input screen of FIG. 8 provides a numerical identification of the ergonomic deviations.

The special assignments input screen selection button of FIG. 3 causes the output of the special assignments input screen illustrated in FIG. 9. This input screen allows the designation of particular workers to particular tasks during particular time periods. Work assignments designated using this screen will not be overridden during the automatic generation of work assignments.

The physical parameters input screen selection button of FIG. 3 causes the output of the physical parameters input screen (not illustrated). This screen allows input of information such as height, weight, arm span and the like.

The worker preferences input screen selection button of FIG. 3 causes the output of the worker preferences input screen (not illustrated). This screen allows the input of any worker preferences for particular tasks and any particular preferences for quarters for the particular tasks.

The quality flag information input screen selection button of FIG. 3 causes the output of the quality flag information input screen (not illustrated). This input screen allows the input of any quality issues for particular workers for particular tasks.

After information related to the plurality of workers have been received, additional work schedule restrictions may be selected. These restrictions include previous shift information, so that the generated work schedule accounts for the previous shifts, and a force 100% rotation restriction, which requires that no worker be assigned to the same task twice in a day.

Returning now to FIGS. 1 and 2*b*, logic for receiving a parameter for optimization 150 receives a parameter for optimization (step 270). The parameter for optimization can be related to any of the information received regarding the workers, such as ergonomic impact, experience or training, worker fit factor and/or the parameter can be related to the assignment itself, such as rotations of workers at various tasks. Logic for generating a work schedule 155 processes the various information in order to satisfy the optimization parameter, and logic for outputting a work schedule provides the optimized work schedule and quality flag information to output interface 125 for output to output device 110 (steps 275-285). FIGS. 10-13 illustrate exemplary user interfaces for outputting work schedules and information related to work schedules.

Figure 13:
FIG. 13 is a block diagram of an exemplary work schedule experience output screen in accordance with the present invention.

Returning to FIG. 3, the work schedule produced by the various input information can be output by selection of one of the plurality of output screen buttons on the right-hand side of the screen. Selection of the worker assignment output screen button produces an output such as that illustrated in FIG. 10. The output illustrated in FIG. 10 provides the overall work schedule, as well as additional information regarding the work schedule, based upon the input information. The additional information can identify a percentage rotation of the workers among the tasks, an average training level of the workers, an average experience level of the workers at each of the tasks, an average ergonomic impact level, the number of ergonomic rule or guidelines deviations for the work schedule, a fit factor based on physical parameters, worker satisfaction and the F Factor. The F Factor is a weighted value of the additional information. Accordingly, if some additional information is more valued in creating a work schedule, such as average training level, compared to other additional information, such as percentage rotation, the former can be more heavily weighted than the later in calculating the F Factor. The output screens of FIGS. 11-13 provide a detailed breakdown by task and time period of the rotation, training and experience level for the work schedule.

Figure 14A:
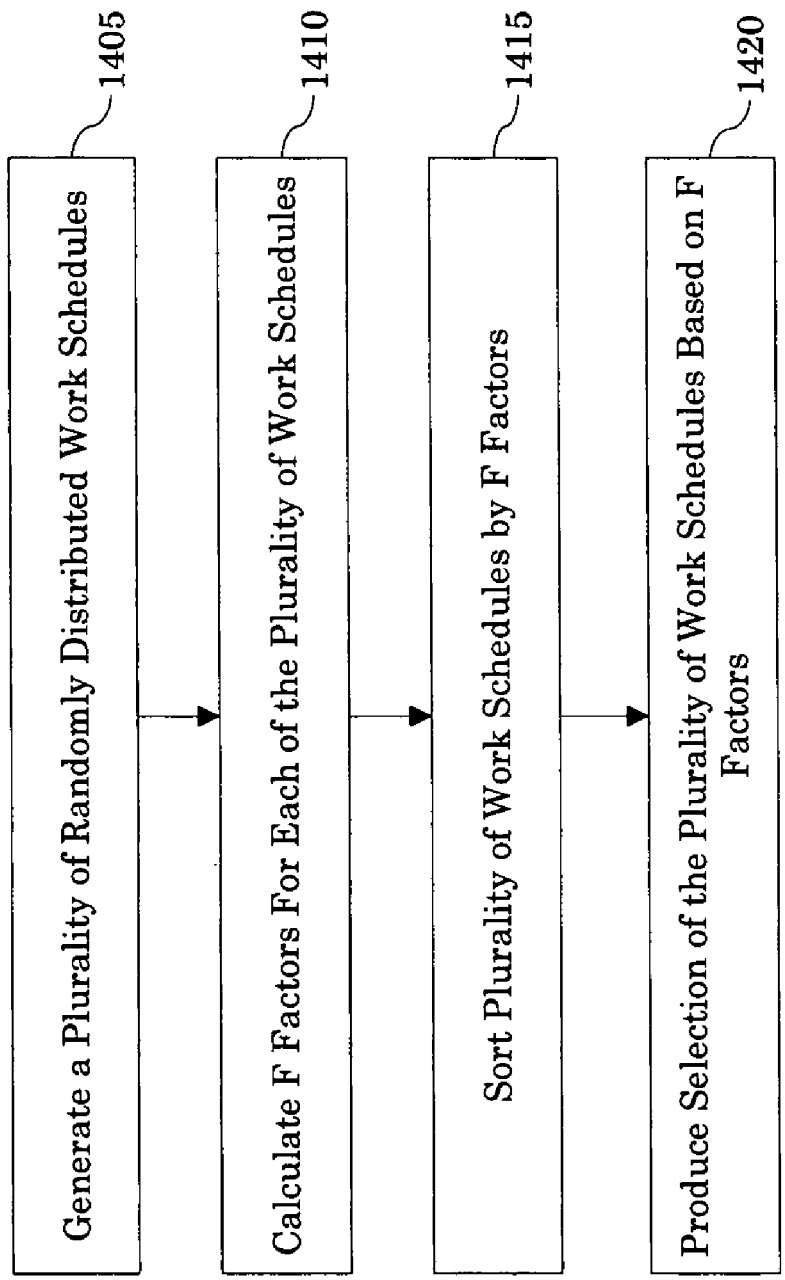
FIGS. 14a and 14b are flow diagrams of exemplary methods for producing a work schedule in accordance with the present invention.

Although exemplary embodiments have been described above as optimizing a work schedule for a single parameter, the present invention can also produce a work schedule optimized for more than one parameter. Depending upon the number of workers, tasks, rotations and/or parameters for optimization, the amount of processing power to produce a perfectly optimized work schedule can exceed that available in a desktop computer. In such cases, the methods of FIG. 14*a* or 14*b* can be employed to reduce the amount of processing power required, while still producing an optimized work schedule. Referring now to FIG. 14*a*, processor 120 generates a plurality of randomly distributed work schedules (step 1405). Processor 120 then calculates F factors for each of the plurality of work schedules and sorts the work schedules by F factors (steps 1410 and 1415). A work schedule can then be selected using the sorted work schedules based upon the F factors (step 1420).

Figure 14B:
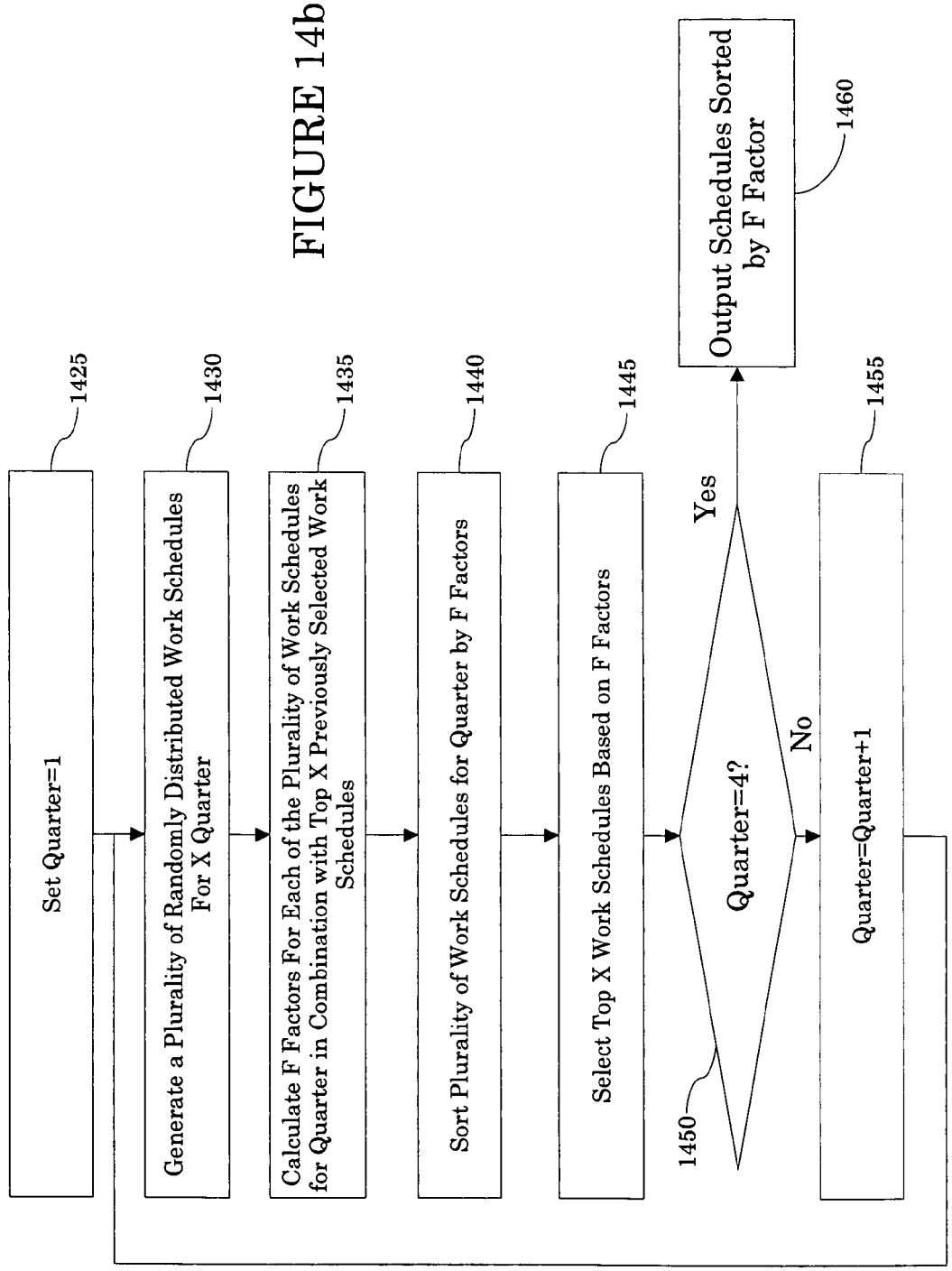

Whereas the method of FIG. 14*a* generates work schedules for all four quarters of a workday in a single processes, the method of FIG. 14*b* generates work schedules on a quarter-by-quarter basis. Accordingly, initially the quarter is set to 1 and a plurality of randomly distributed work schedules are generated for the first quarter (steps 1425 and 1430). The F factor of each of the plurality of work schedules are calculated for the quarter in combination with the top X previously selected work schedules (step 1435). The work schedules are then sorted by F factor and a predetermined number X of work schedules with the top F factors are selected (steps 1445). Processor 120 then determines whether a schedule including four quarters has been generated (step 1450). If a schedule with four quarters has been generated ("Yes" path out of decision step 1450), then the top X work schedules are output (step 1460). If, however, the schedule is for less than four quarters ("No" path out of decision step 1450), then quarter is incremented by one, and a new set of randomly distributed work schedules are generated using the top X work schedules for the previous quarters (step 1455).

By generating a large number of randomly distributed work schedules a large sampling of work schedules can be produced with much less processing power than would be required to evaluate all possible distributions of the variables. Moreover, by comparing the optimized value to a predetermined value, only a work schedule which meets a value that is considered to be minimally optimal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a work schedule, comprising the acts of:
    receiving, by a processor, an identification of a number of work periods and a plurality of tasks;
    receiving, by the processor, information for a plurality of workers related to the plurality of tasks;
    receiving, by the processor, a parameter for optimization;
    receiving, by the processor, a first input from a user interface of an assigned task for a first worker of the plurality of workers for a particular time period;
    determining and outputting, by the processor, a work schedule incorporating the assigned task for the first worker and distributing the plurality of workers into the plurality of tasks for each of the number of work periods, wherein the work schedule is optimized for the parameter; and
    receiving, by the processor, a second input from the user interface of quality data for a second worker of the plurality of workers for a particular task;
    wherein the quality data for the second worker is taken into account in determining the work schedule;
    wherein the parameter for optimization includes a weighted value determined from at least two of worker satisfaction, rotation, training, experience, ergonomic impact, and ergonomic impact standard deviations parameters;
    wherein at least one of the parameters used to determine the weighted value is more heavily weighted than other parameters used to determine the weighted value; and
    wherein an ergonomic impact is input for each of the plurality of tasks and the parameter for optimization is ergonomic impact of the plurality of tasks such that the work schedule does not exceed a predetermined ergonomic impact level for each of the plurality of workers.

2. The method of claim 1, further comprising the act of:
    receiving, by the processor, a restriction for a second worker of the plurality of workers, wherein the second worker is assigned to tasks in the work schedule other than one which is restricted for the second worker.

3. The method of claim 2, wherein the restriction is related to ergonomic impact.

4. The method of claim 1, further comprising the act of:
    receiving, by the processor, restrictions related to all of the plurality of workers, wherein the work schedule satisfies the restrictions related to the plurality of workers.

5. The method of claim 4, wherein the restrictions are related to a number of rotations between tasks.

6. The method of claim 1, wherein the information for the plurality of workers is an experience level for each of the plurality of tasks.

7. The method of claim 1, wherein the information for the plurality of workers is a level of training for each of the plurality of tasks.

8. The method of claim 1, wherein the ergonomic impact is related to the impact on a plurality of body parts, and the predetermined ergonomic impact level is for each of the plurality of body parts.

9. The method of claim 1, wherein the act of outputting the work schedule comprises the acts of:
    determining, by the processor, a plurality of work schedules distributing the plurality of workers into the plurality of tasks for each of the number of work periods; and
    selecting for output, by the processor, one of the plurality of work schedules which is optimized for the parameter.

10. The method of claim 9, wherein the parameter is a weighted value of a number of parameters.

11. The method of claim 1, wherein the act of determining and outputting the work schedule comprises the acts of:
    generating, by the processor, a plurality of work schedules for a first time period;
    selecting, by the processor, a number of the plurality of work schedules based on a weighted value of a number of parameters;
    generating, by the processor, a second plurality of work schedules for a second time period; and
    selecting a number of the second plurality of work schedules based on the weighted value.

12. A processor including a non-transitory computer-readable medium encoded with logic for generating a work schedule, the logic comprising instructions for:
    receiving an identification of a number of work periods and a plurality of tasks;
    receiving information for a plurality of workers related to the plurality of tasks;
    receiving a parameter for optimization;
    receiving, by the processor, a first input from a user interface of an assigned task for a first worker of the plurality of workers for a particular time period;
    determining and outputting, by the processor, a work schedule incorporating the assigned task for the first worker and distributing the plurality of workers into the plurality of tasks for each of the number of work periods, wherein the work schedule is optimized for the selected parameter; and
    receiving, by the processor, a second input from the user interface of quality data for a second worker of the plurality of workers for a particular task;
    wherein the quality data for the second worker is taken into account in determining the work schedule;
    wherein the parameter for optimization includes a weighted value determined from at least two of worker satisfaction, rotation, training, experience, ergonomic impact, and ergonomic impact standard deviations parameters;

wherein at least one of the parameters used to determine the weighted value is more heavily weighted than other parameters used to determine the weighted value; and wherein an ergonomic impact is input for each of the plurality of tasks and the parameter is ergonomic impact of the plurality of tasks such that the work schedule does not exceed a predetermined ergonomic impact level for each of the plurality of workers.

13. The processor of claim 12, wherein the instruction for receiving information for the plurality of workers comprises:

receiving a restriction for a second worker of the plurality of workers, wherein the second worker is assigned to tasks in the work schedule other than one which is restricted for the second worker.

14. The processor of claim 13, wherein the restriction is related to ergonomic impact.

15. The processor of claim 13, wherein the instruction for receiving information for the plurality of workers comprises:

receiving restrictions related to all of the plurality of workers, wherein the work schedule satisfies the restrictions related to the plurality of workers.

16. The processor of claim 15, wherein the restrictions are related to a number of rotations between tasks.

17. The processor of claim 12, wherein the information for the plurality of workers is an experience level for each of the plurality of tasks.

18. The processor of claim 12, wherein the information for the plurality of workers is a level of training for each of the plurality of tasks.

19. The processor of claim 12, wherein the ergonomic impact is related to the impact on a plurality of body parts, and the predetermined ergonomic impact level is for each of the plurality of body parts.

20. The processor of claim 12, wherein the instruction for outputting the work schedule comprises:

determining a plurality of work schedules distributing the plurality of workers into the plurality of tasks for each of the number of work periods; and selecting for output, one of the plurality of work schedules which is optimized for the selected parameter.

21. The processor of claim 20, wherein the parameter is a weighted value of a number of parameters.

22. The processor of claim 12, wherein the instruction for outputting the work schedule comprises:

generating a plurality of work schedules for a first time period;

selecting a number of the plurality of work schedules based on a weighted value of a number of parameters;

generating a second plurality of work schedules for a second time period; and selecting a number of the second plurality of work schedules based on the weighted value.

* * * * *